United States Patent [19]

Korb

[11] Patent Number: 4,845,623
[45] Date of Patent: Jul. 4, 1989

[54] PROCESS FOR DISPLAYING OIL CHANGE INFORMATION IN AN INTERNAL COMBUSTION ENGINE

[75] Inventor: Jean-Pierre Korb, Rueil-Malmaison, France

[73] Assignee: Regie Nationale Des Usines Renault, Boulogne Billancourt, France

[21] Appl. No.: 72,655

[22] Filed: Jul. 7, 1987

[30] Foreign Application Priority Data

Jul. 11, 1986 [FR] France .................. 86-10155

[51] Int. Cl.$^4$ .......................................... F01M 11/10
[52] U.S. Cl. .......................... 364/431.03; 364/581; 340/439; 340/457.4; 123/196 S
[58] Field of Search .............. 364/431.03, 581; 123/196 R, 196 S, 198 DA; 73/64, 116, 117.3; 340/52 F, 52 R; 184/6.4

[56] References Cited

U.S. PATENT DOCUMENTS

| | | | |
|---|---|---|---|
| 4,031,363 | 6/1977 | Freeman | 340/52 F |
| 4,344,136 | 8/1982 | Panik | 340/52 F |
| 4,483,301 | 11/1984 | Yamada | 340/52 F |
| 4,630,027 | 12/1986 | Muhlberger et al. | 340/52 F |
| 4,677,847 | 7/1987 | Sawatari et al. | 73/64 |
| 4,704,598 | 11/1987 | McLeod | 340/52 F |
| 4,706,193 | 11/1987 | Imago et al. | 123/196 S |
| 4,742,476 | 5/1988 | Schwartz et al. | 123/196 S |

Primary Examiner—Parshotam S. Lall
Assistant Examiner—Ellis B. Ramirez
Attorney, Agent, or Firm—Oblon, Spivak, McClelland, Maier & Neustadt

[57] ABSTRACT

A process for displaying engine oil change information for an internal combustion engine equipped with an electronic injection calculator linked to an onboard computer consisting of the calculation of (N) number of weighted kilometers. The reduction of the period (T) pulses by a period (d) at each (N) kilometers to a minimum threshold ($T_o$) corresponding to (M.N.) weighted kilometers. The storage of (M.N.) weighted kilometers, their subtraction of the stored weighted kilometers from the actual kilometers remaining to be traveled and the display of the actual kilometers remaining to be traveled before oil change.

2 Claims, 1 Drawing Sheet

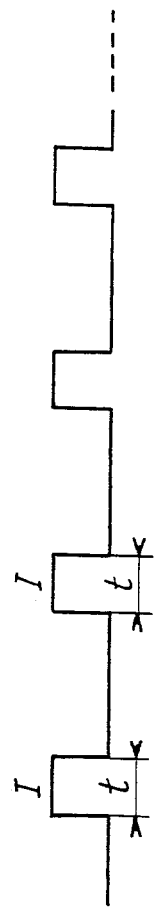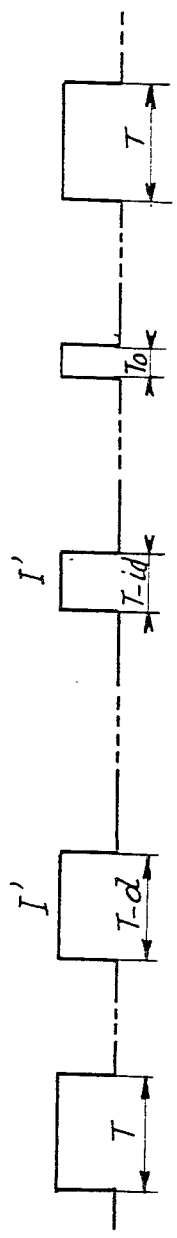

PROCESS FOR DISPLAYING OIL CHANGE INFORMATION IN AN INTERNAL COMBUSTION ENGINE

BACKGROUND OF THE INVENTION

Field of the Invention

In a motor vehicle equipped with an electronic injection calculator and an onboard computer provided with display means, it is advantageous to be able to display to the driver both the fuel consumption and the number of kilometers remaining to be traveled before the engine oil change. So that the cost of providing this information will not be expensive, the use of any additional means of computation and information transmission must be avoided.

For this purpose, this invention proposes the use of the injection calculator and the onboard computer which already exist for the engine, without an additional connections needed between them, to transmit this information about the need for an oil change, thereby eliminating costs.

The object of the invention relates to a process of displaying engine oil change information for an internal combustion engine equipped with an electronic injection calculator linked by a connecting wire to an onboard computer provided with a display device, said calculator supplying to the onboard compuer pulses I′ of period T corresponding to the fuel consumption, characterized in that it consists of the following steps; first of all by the electronic calculator:
 (a) calculation of a fixed number N of weighted kilometers corresponding to the actual kilometers traveled by the vehicle and corrected by a coefficient which is a funciton of certain known parameters of engine operation;
 (b) reduction of the initial period T of pulses I′ by period d at each calculation of N weighted kilometers to a minimum threshold $T_o$ with a pulse period corresponding to M.N weighted kilometers;
 (c) resetting of the period of pulses I′ to its initial value T;

and then by the onboard computer:
 (d) storage of M.N weighted kilometers
 (e) substraction of these M.N weighted kilometers from the actual kilometers remaining to be traveled before oil change, stored during the preceding calculation;
 (f) display of the actual kilometers remaining to be traveled before oil change.

BRIEF DESCRIPTION OF THE DRAWINGS

Other characteristics and advantages of the invention will be evident from reading the description of the following figures which show:

FIG. 1 shows the pulses corresponding to the fuel consumption calculated by the injection calculator, transmitted to the onboard computer, according to prior art systems;

FIG. 2 shows the same pulses transmitted according to this, invention.

DETAILED DESCRIPTION OF THE DRAWINGS

At present, the electronic injection calcualtor which is part of a motor vehicle calculates the fuel consumption of the vehicle as a function of a certain number of parameters of the operation of the engine. This calculator emits a pulse train I, of fixed period t, over a connecting wire to the onboard computer (FIG. 1). Each pulse I corresponds to a fixed amount Q of gasoline injected. The onboard computer subtracts these fuel amounts Q from the amount remaining in the tank and its display device informs the driver of the vehicle of the fuel consumption at that moment or the average fuel consumption, of the number of kilometers remaining to be traveled or of the number of liters remaining in the tank.

The invention proposes the use of these same means to inform the driver of the need for an oil change. For this purpose, the electronic calculator calculates weighted kilometers, i.e., kilometers actually traveled by the vehicle corrected by a coefficient which is a function of certain parameters of engine operation.

That is, weighted kilometers KW equal K+(C·K), where K is actual kilometers driven and C is a coefficient based upon parameters such as engine temperature. These parameters can be, for example, oil temperature, engine speed, etc... When the electronic calculator has determined a fixed number N of weighted kilometers, it subtracts from the initial period T of pulses I′, corresponding to the amount of fuel injected, a period d. It performs this subtraction each time it has calculated N weighted kilometers, for M number of times until the period of pulses I reaches a set minimum threshold $T_o = T - M.d$.

FIG. 2 shows pulse train I′ emitted by the electronic calculator which simultaneously transmits information on fuel consumption and the need for an engine oil change. Compared to pulses I emitted by the calculator for fuel consumption alone, they have an initial period T higher than the period t of these pulses.

Before the electronic calculator has determined N weighted kilometers, pulses I′ going to the onboard computer have an initial period T. When N weighted kilometers has been calculated, pulses I′ have a period shorter than T, equal to T−d. Each time N weighted kilometers are obtained, the period of impulses I′ decreases and is equal to T−i·d, being a whole number between O and M. When the calculator has found M.N weighted kilometers, the period of pulses I′ equal to $T - M·d = T_o$, has reached a minimum threshold $T_o$. The calculator then resets the period of pulses I′ to its initial value T.

At that instant, the onboard computer stores the calculated M.N. weighted kilomters, then subtracts the stored M.N. weighted kilometers from the preceding actual kilometers remaining to be traveled stored during the preceding calculation. The information on the number of actual kilometers remaining to be traveled, before performing a oil change, is than displayed on the vehicle dashboard. And the process is repeated as above.

At each oil change, the onboard computer is reintialized to the maximum number of kilometers provided, 10,000 kilometers for example, during sending of a special code, determined in advance by a diagnostic tool. This code can arrive directly at the onboard computer if a direct connection exists between the latter and the diagnostic too. Alternatively, this code can also go through the electronic injection calculator which sends it over its link with the onboard computer. This code is in the form of a pulse train I″ determined in advance and which is different from the pulse train I′ described above. This code is then interpreted by the onboard computer as a reinitialization of the maximum number of kilometers to be traveled before another oil change.

One of the advantage of this invention lies in the fact that the same connecting wire between the electronic calculator and the onboard computer allows the transmission of two separate pieces of information which are, on the one hand, fuel consumption and the number of weighted kilometers traveled by the vehicle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by lettters patent of the U.S. is:

1. A process for diplaying engine oil change information for an internal combustion engine equipped with an electronic injection calculator linked by a connecting wire to an onboard computer provided with a display device, said calculator supplying the onboard computer with pulses (I') of period (T) corresponding to the fuel consumption comprising the following steps;

calculation, by the electronic calculator, a fixed number N of weighted kilometers corresponding to the actual kilometers traveled by the vehicle and corrected by a coefficient which is a function of certain parameters of engine operation;

reduction, by the electronic calculator, of the initial period T of pulses I' by period d at each calculation of N weighted kilometers, to a minimum threshold ($T_o$) with a pulse period corresponding to (M.N.) weighted kilometers;

resetting, by the electronic calculator, the period of pulses (I') to its initial value (T);

storage by the onboard computer of (M.N.) weighted kilomters;

substraction by the onboard computer of these (M.N.) weighted kilometers from the actual kilometers remaining to be traveled before oil change, stored during the preceding calculation;

displaying of the actual kilometers remaining to be traveled before oil change.

2. A process according to claim 1, wherein the onboard computer receives, directly by a diagnostic tool or by the electronic injection calculator, a special code consisting of a pulse train (I'') intended to authorize the reinitialization of the maximum number of kilometers to be traveled before another oil change.

* * * * *